United States Patent [19]

Tesson et al.

[11] Patent Number: 4,499,246

[45] Date of Patent: Feb. 12, 1985

[54] EPOXY RESINS CONTAINING AS A LATENT CATALYST/ACCELERATOR HALOGENOBISPHENATES OF TERTIARY AMINES

[75] Inventors: Gérard Tesson; Christian Joseph, both of Chateaurenault, France

[73] Assignee: Societe Anonyme Dite "Manufacture de Produits Chimiques Protex", Paris, France

[21] Appl. No.: 579,849

[22] Filed: Feb. 13, 1984

[30] Foreign Application Priority Data

Feb. 11, 1983 [FR] France ............................... 83 02872

[51] Int. Cl.³ .............................................. C08G 59/68
[52] U.S. Cl. ..................................... 525/486; 525/507; 525/934; 528/93; 528/94; 528/408; 564/280
[58] Field of Search ................. 525/486, 507; 528/93, 528/94, 408; 564/280

[56] References Cited

U.S. PATENT DOCUMENTS

| | | | |
|---|---|---|---|
| 2,541,816 | 2/1951 | Glarum et al. | 564/280 |
| 2,783,279 | 2/1957 | Chiddix | 564/280 X |
| 2,993,934 | 7/1961 | Rosen | 564/280 X |
| 3,284,407 | 11/1966 | Winfield et al. | 528/93 X |
| 4,250,293 | 2/1981 | Beitchman et al. | 528/93 |

Primary Examiner—Earl A. Nielsen
Attorney, Agent, or Firm—Karl F. Ross; Herbert Dubno

[57] ABSTRACT

A catalyst and accelerator for an epoxy system which consists of a halogenobisphenate of a catalytically active tertiary amine and which is obtained in a solid form practically water insoluble and odor free but which nevertheless possess the catalytic activity of the tertiary amine. The application describes the proportion of the catalyst by reacting an aqueous suspension of the halogenobisphenol with the tertiary amine, the proportion of epoxy resin systems containing the catalyst and the epoxy resin systems thus formed.

12 Claims, No Drawings

EPOXY RESINS CONTAINING AS A LATENT CATALYST/ACCELERATOR HALOGENOBISPHENATES OF TERTIARY AMINES

FIELD OF THE INVENTION

Our present invention relates to improved catalysts or accelerators for epoxy systems and, more particularly, to the use of halogenobisphenates of tertiary amines as catalysts and latent accelerators for epoxy systems. The invention also relates to epoxy systems containing these catalysts and accelerators, to the preparation of such epoxy systems and to a process for preparing the halogenobisphenates of tertiary amines suitable for use as catalysts and accelerators in epoxy systems.

BACKGROUND OF THE INVENTION

It is known that tertiary amines are catalysts for epoxy systems and can be utilized to accelerate the hardening of liquid or solid epoxy resins. Catalysts and accelerators of this class which are well known for such purposes include benzyldimethylamine, 2-(dimethylaminomethyl)-phenol, 2,4,6-tris(dimethylaminomethyl)-phenol and triethanolamine. These tertiary amines have the common property of being extremely reactive at ambient temperature and thus react strongly in comparatively brief periods of time with the epoxy resin. As a consequence, the pot life of such systems ranges only from several minutes to several hours. Such short pot lives may be inconvenient for many applications. In addition, the tertiary amines mentioned are irritants to the personnel utilizing same and are hygroscopic.

It has been proposed to increase the pot life by the use of salts of tertiary amines in epoxy systems. Tertiary amine salts which have been utilized for this purpose include the tri-2-ethylhexoate of 2,4,6-tris(dimethylaminomethyl)phenol. Such salts, by comparison with the tertiary amines from which they derive, have the advantage that they are significantly less reactive without introducing serious drawbacks into the epoxy system and hence can increase the pot life without any accompanying drawbacks of a type which may be detrimental to the product.

However, they are generally of a liquid form which interferes practically entirely with any effort to utilize them in solid epoxy systems. Most of the tertiary amine salts which have been found to be suitable, moreover, are soluble in water, a characteristic which complicates the preparation of the salts. Furthermore, the salts generally possess odors as strong as or stronger than the odors of the amines from which they derive and may be as irritating or more irritating. Perhaps, however, the greatest drawback of such salts is that their hygroscopicity precludes use in any number of applications.

Efforts have been made to develop catalysts or accelerators which are insoluble in water and without the odor characteristic of the compounds previously described. The compounds which have thus been developed, e.g. as described in U.S. Pat. No. 3,497,524, are the tertiary amine salts of tetrachlorophthalic acid and tetrabromophthalic acid. These tertiary amine salts, when utilized as catalysts, permit the preparation of epoxy systems having extremely long pot lives and enable the storage of the composition at ambient temperature for prolonged periods while nevertheless insuring rapid hardening at temperatures of the order of 120° to 250° C.

It appears that with these compounds part of the acid of the composition blocks or deactivates the tertiary amine moiety to promote the cold stability of the system. With heating, however, the salt appears to dissociate with liberation of free tertiary amine to catalyze the epoxy reaction while the acid at the elevated temperature combines with the hydroxyl groups present in the system. As a consequence, there is a formation of ester groups, with each esterification liberating a molecule of water. The formation of water during the hardening phase, while not considerable, is nevertheless a serious drawback for the epoxy system because the trapped water materially reduces the physical and electrical properties of the hardened resin. In part the water which is liberated represents a volatile component. This defeats another advantage of an epoxy system which is the fact that normally such a system is utilized because it is capable of hardening without the volatile material.

French Pat. No. 1,282,310 describes the use of certain substituted ammonium phenates as accelerators of epoxide resin based and polycarboxylate acid anhydride based hardenable mixtures. While such systems may be desirable in many cases where liquid formulations can be used, they have not been found to be effective when the system is in the form of a powder, namely a molding powder or a powder which is to be applied to a substrate from a fluidized bed. These systems, moreover, have significant hygroscopicity, low fluidity in a molten state and low resilience, i.e. high rigidity, which translates into a greater brittleness or fragility than may be desirable.

The use of phenolic novolac resins as hardeners for epoxy systems accelerated by tertiary amines has reduced the problem of hygroscopicity which was formerly associated with the tertiary amines and also eliminates in part the problem of fluidity of the powder. These improved systems, however, have little long term storage capabilities with evolution on storage which results in a rapid loss of fluidity on molding. If one attempts to reduce the amount of acceleration which is present to increase fluidity and storage life, one tends to reduce the speed of hardening to a level which is incompatible with industrial molding operations.

OBJECTS OF THE INVENTION

It is, therefore, the principal object of the present invention to overcome the drawbacks of earlier catalyst and accelerator systems for epoxy resins.

Another object of this invention is to obviate the disadvantages of the systems previously described by providing an improved accelerator or catalyst for an epoxy system which is able to provide increased pot life at ambient temperature, rapid hardening and setting at elevated temperatures, good fluidity and desirable mechanical and electrical properties with reduced brittleness.

SUMMARY OF THE INVENTION

We have now found that when a halogenobisphenate of a tertiary amine is utilized as a catalyst, accelerator or activator for an epoxy system and especially an epoxy system provided with a phenolic or cresylic novolac hardener, the resulting composition is characterized by extraordinarily long pot life or storage time at ambient temperature, high fluidity in the molten state and excellent properties in the hardened or polymerized state.

It appears that the halogenobisphenates of tertiary amines impart not only a uniquely high fluidity to a solid epoxy resin system but also induce a far more rapid hardening of the system than can be obtained with the corresponding tertiary amines utilized alone or in the free state, a fact which is indeed extraordinary and unexpected in the art.

The new catalysts of the invention can be utilized in the form of powders which are insoluble in water and are without significant odor. They are not hygroscopic and are capable of producing an epoxy system which is particularly latent at ambient temperature but which hardens rapidly when the system is heated to temperatures of the order of 120° to 250° C. without the formation of water. It appears that the halogenobisphenates of the tertiary amines dissociate upon heating with liberation of the tertiary amine and the corresponding halogenobisphenol which reacts immediately with the epoxy group without the formation of byproducts.

The halogenobisphenols of the invention are preferably the chlorinated, brominated, iodinated and fluorinated derivatives of bisphenol A (diphenylolpropane), bisphenol B (bis-(hydroxy-4-phenyl)-2,2-butane), bisphenol F (bis-(hydroxy-4-phenyl)-methane), 4,4'-dihydroxydiphenyl and 4,4'-dihydroxydiphenylsulfone.

The halogenobisphenols which have been found to be most advantageous of this group, partly because of their cost, partly because of their commercial availability and partly because of the properties they confer to the hardened epoxy system, are the tetrabromobisphenol A and the tetrachlorobisphenol A.

The tertiary amines which are used can be any of those previously discussed or utilized in conventional catalysts for the formulation of epoxy systems. The preferred tertiary amines are benzyldimethylamine, 2-(dimethylaminomethyl)phenol, 2,4,6-tris(dimethylaminomethyl)phenol, triethylamine, triethanolamine, triethylenediamine, imidazole, isopropylimidazole and 2-ethyl-4-methylamidazole.

The halogenobisphenates of the tertiary amines of the invention are prepared by the reaction in a heterogeneous aqueous phase of the halogenobisphenol compound with the tertiary amine. To the dispersion of the halogenobisphenol in water, the tertiary amine is added and the reaction system is heated to a temperature between 50° and 100° C., preferably between 70° and 80° C., over a period of 3 to 6 hours. After cooling, filtration, washing with water and drying at 70° to 80°, the halogenobisphenate of the tertiary amine is obtained in the form of whitish powder which flows freely and is practically free of odor. This powder contrasts sharply with the irritating and odoriferous free tertiary amine.

The halogenobisphenates of the tertiary amines of the invention have a mole ratio between the phenol equivalent and the tertiary amine equivalent which varies between 1 and 4 and is preferably between substantially 1.25 and 3.0. The ratio is most preferably about 2 for most of the tertiary amines. However, with tertiary amines which are weakly basic and of high molecular weight such as the 2,4,6-tris(dimethylaminomethyl)phenol, the preferred ratio can be less than 1.3.

Reference will be made herein to the phenol equivalent or the tertiary amine equivalent and in the respective cases this can correspond to the number of phenolic hydroxyl groups or the number of tertiary amine nitrogens per molecule, respectively. For example, the phenol equivalent is 2 for the tetrabromobisphenol A and the tertiary amine equivalent is 1 and 3, respectively, for triethanolamine and 2,4,6-tris(dimethylaminomethyl)phenol.

The halogenobisphenates of tertiary amines according to the invention are essentially nonreactive at ambient temperature with other components of a solid epoxy resin system or the powder so that the compositions to which these compounds are added can be stored for long periods in the solid or powder form without deterioration. Even in liquid epoxy resin systems, the halogenobisphenates of tertiary amines have an extremely low reactivity at ambient temperature. Both in the solid and liquid systems, however, the halogenobisphenates of the tertiary amines act essentially in the same manner as the free amines when the system is heated to hardening temperatures of the order of 120° to 250° C.

The invention also comprises epoxy resin formulations with improved characteristics containing the halogenobisphenates of tertiary amines as catalysts and accelerators.

The epoxy resin formulations of improved characteristics can be prepared preferably utilizing bisphenol A resins, epoxydized phenolic novolac resins and epoxidized cresylic novolac resins, utilized alone or in any combination with one another. Most preferably the resin comprises a bisphenol resin with an epoxy equivalent of about 170 to 300 for the liquid resin and an epoxy equivalent of 300 to 6000 for a solid resin, an epoxidized phenolic novolac resin having an epoxy equivalent of about 160 to 180 for the liquid resin and about 175 to 220 for the solid resin, or an epoxidized cresylic novolac resin having an epoxide equivalent of about 200 to 250.

The hardeners for the epoxy resin which is accelerated by the halogenobisphenates of the invention should exclusively be constituted by phenolic novolac or the cresylic novolac resins which may be halogenated.

The phenolic novolac or cresylic novolac resins which are utilized in the compositions of the invention are the acid catalyst condensation products of phenol or cresol with formaldehyde and where halogenated novolac resins are produced, the phenol or cresol can be halogenated prior to reaction with the formaldehyde. These novolac resins are in the form of liquid, semisolid or solid products with the melting points of the latter being between substantially 40° C. and 150° C.

The proportion of hardener to the epoxy resin is preferably between 0.5 and 1 equivalent of the hardener for each epoxy equivalent of the resin and the proportion of the halogenobisphenate is that which corresponds to 0.02 to 2% by weight of the active tertiary amine with respect to the total weight of the epoxy resin plus hardener. This can correspond to the addition of 0.2 to 20% by weight of catalyst in the composition according to the invention.

To these epoxy resin formulations which are to have improved characteristics, it is possible to add additives known in the art to be suitable as fillers or the like, such additives making up up to 75 to 80% of the total weight of the formulation.

These additives can include fillers such as quartz meal, ground silica and sand, comminuted silicates, schist meal, aluminum oxide (hydrated or not) or hydrated alumina powder, crushed dolomite, talc and/or barium sulfate.

Reinforcing additives which can be utilized can include glass fibers, cut or broken, asbestos fibers, carbon fibers, boron fibers, organic fibers, wood dust, cellulose, comminuted polyamides, comminuted polyester fibers and comminuted polyacrylonitrile or fibers thereof, alone or in any combinations or in mutual admixtures.

The additives can include coloring agents or masking agents such as the white titanium oxide, yellow iron oxide, blue and green phthalocyanine pigments, red mercury, cadmium and iron oxide pigments, maroon or brown iron oxide and, as black pigments, carbon and iron oxide.

Other additives which can be utilized include lubricating agents and mold separating agents or demolding agents and can include those lubricants and mold release agents utilized in the art heretofore. These can include magnesium stearate, calcium stearate, zinc stearate, glycerol monostearate, stearic acid, beeswax, carnauba wax, candelilla wax, paraffin wax and synthetic waxes of a montanic acid or amide, or polyethylene or silicone base.

In addition, additives which alter the properties of the formulation can be added such as materials which change the rheological properties, the flow properties, surface tension and the like. Changes which introduce thixotropy or prevent pitting or cratering can also be added. These property modifiers include the acrylic polymers, fluorocarbon derivatives, epoxidized oils, polyvinylbutyral and colloidal silica. All of those compounding substances utilized in the art heretofore in epoxy resins can be employed equally well in the present case.

SPECIFIC EXAMPLES

EXAMPLE 1

A two liter reactor is equipped with a thermometer and a reflex cooler and is used to heat 1000 ml of water to which 436 g of tetrabromobisphenol A is added. 0.8 mole of the latter corresponds to 1.6 phenol equivalent. The dispersion is heated with strong agitation. To this dispersion by means of an addition tube or ampule, 108 g of benzyldimethylamine (0.8 mole with 0.8 tertiary amine equivalent) is added. The reaction mixture is maintained for 4 hours at 80° C. and is then cooled to 20° C. The reaction mixture is filtered on a Buchner funnel and the solid which is retained on the funnel is there washed with 1000 ml of cold water. It is then dried to a constant weight at 70° to 80° C.

537 g (corresponding to a yield of 98.7%) of tetrabromobisphenol A of benzyldimethylamine is obtained in the form of a fine white odorless nonhygroscopic powder having a melting point of 145° C. and a tertiary amine nitrogen content of 1.95% (theoretical=2.06%). The ratio of phenol equivalent to the tertiary amine equivalent was 2.

EXAMPLE 2

Utilizing the conditions of Example 1 and starting with 436 g (0.8 mole with 1.6 phenol equivalent) of tetrabrombisphenol A and 106 g (0.4 moles with 1.2 tertiary amine equivalent) of 2,4,6-tris(dimethylaminomethyl)phenol, 507 g (corresponding to a yield of 98.7%) of the tetrabromobisphenol A of 2,4,6-tris(dimethylaminomethyl)phenol is obtained in the form of a yellow, nonhygroscopic and practically odorless powder. The melting point of the product is 105° C. and the content of tertiary amine nitrogen is 2.94% (theoretical=3%) in this case the halogenobisphenate of the tertiary amine has a ratio of the phenol equivalent to the tertiary amine equivalent of 1.33.

EXAMPLE 3

Utilizing the conditions of Example 1 and starting with 436 g (0.8 mole with a phenol equivalent of 1.6) of tetrabromobisphenol A and 119 g (0.8 mole with 0.8 tertiary amine equivalent) of triethanolamine, 540 grams (97.4% yield) of a tetrabromobisphenate A of triethanolamine is obtained in the form of a white nonhygroscopic odorless powder with a melting point of 158° C. and a concentration of tertiary amine nitrogen of 1.84% (theoretical=2.0%). In this case, the halogenobisphenate of the tertiary amine has a ratio of the phenol equivalent to the tertiary amine equivalent of 2.

EXAMPLE 4

Again using the conditions described in Example 1 and starting from 436 g (0.8 mole with 1.6 phenol equivalent) of tetrabromobisphenol A and 88 g (0.8 mole with 0.8 tertiary amine equivalent) of triethanolamine, 5.15 g (corresponding to a yield of 98.5%) of the tetrabromobisphenate A of triethanolamine is obtained in the form of a white powder which is nonhygroscopic, odorless and has a melting point of 187° C. and a concentration of total tertiary amine nitrogen of 2.01%.

Utilizing the same techniques and in appropriate mole proportions, the corresponding tetrabromobisphenates are formed by the reaction of tetrabromobisphenol A with the following amines: triethylenediamine, 2-(dimethylaminomethyl)phenol, imidazole, isopropylimidazole and 2-ethyl-4-methylamidazole.

The halogenobisphenates obtained have ratios of the phenol equivalent to the tertiary amine equivalent of 2 and the powders range in color from whitish to yellowish, are nonhygroscopic and odorless.

EXAMPLE 5

Utilizing the conditions of Example 1 and by reacting 292 g (0.8 mole with 1.6 phenol equivalent) of tetrachlorobisphenate A and 108 grams (0.8 mole with 0.8 tertiary amine equivalent) of benzyldimethylamine 388 g (yield=97.0%) of the tetrachlorobisphenate A of benzyldimethylamine is obtained in the form of a whitish nonhygroscopic and odorless powder with a melting point of 135° C. and a concentration of tertiary amine nitrogen of 2.8% (theoretical=2.8%). In this case, the ratio of phenol equivalent to tertiary amine equivalent is 2 for the halogenobisphenate of the tertiary amine.

EXAMPLE 6

Utilizing the conditions of Example 1 but reacting 292 g (0.8 mole with 1.6 phenol equivalent) of tetrabromobisphenol A and 106 g (0.4 mole with 1.2 tertiary amine equivalent) of 2,4,6-tris(dimethylaminomethyl)phenol, 391 g (yield=98.2) of the tetrachlorobisphenate A of the 2,4,6-tris(dimethylaminomethyl)phenol is obtained in the form of a beige nonhygroscopic and practically odorless powder having a melting point of 164° C. and a concentration of tertiary amine nitrogen of 3.94% (theoretical=4.06). The halogenobisphenate thus obtained as a ratio of phenol equivalent to tertiary amine equivalent of 1.33.

EXAMPLE 7

Operating as in Example 1 with 228 g (1 mole corresponding to 2 phenol equivalents) of bisphenol A and reacting 132.5 g (0.5 moles corresponding to 1.5 tertiary amine equivalent) of 2,4,6-tris(dimethylaminomethyl)phenol, a tarry stringy product is obtained which is partially soluble in water and impossible to isolate in powder form and without a concentration of tertiary amine nitrogen which is significant. The process is repeated utilizing the bisphenol F (diphenylmethane), bisphenol B and 4,4'-dihydroxydiphenylsulfone as phenol group carriers.

The products are not solids and tests with these phenol carriers with other tertiary amines as utilized in Examples 1-6, likewise fails to provide solid products in an easily handled form with a sufficient concentration of tertiary amine nitrogen. Where solids are obtained, they are at least partially soluble in water. Surprisingly, preparation of powdered water-insoluble solids can only be obtained utilizing the halogenobisphenols and thus can be considered a property specific to the use thereof. The significance of the water insoluble salts of the tertiary amines, apart from their high stability at ambient temperature is that they are essentially free from odors and are nonirritating, contrasting sharply with the tertiary amines from which they are made. However, at the hardening temperatures of the resin, the halogenobisphenates of the tertiary amines have substantially the same catalytic or accelerating action as the corresponding free amines. The following examples illustrate formulations of systems utilizing liquid epoxy resins and solids utilizing the halogenobisphenates of tertiary amines according to the invention.

EXAMPLE 8

Three mold powders are prepared each containing as an epoxy resin I, an epoxidized phenolic novolac with an epoxy equivalent of 178 and a functionality of about 3.6. Resin II is a solid phenolic novolac with a capillary melting point of 85° C., a hydroxyl index of about 550 and a free phenol content of 2%.

Powder A contains a triethanolamine catalyst of the latent commercial type in which the triethanolamine is carried by a molecular sieve while powders B and C contain respectively latent catalysts according to the invention. The complete formulations are given in the following table:

|  | Powder A | Powder B | Powder C |
|---|---|---|---|
|  | (Parts by Weight) | | |
| Epoxy Resin I | 22 | 22 | 22 |
| Phenolic Novolac II | 11 | 11 | 11 |
| Calcium Stearate | 0.25 | 0.25 | 0.25 |
| Zinc Stearate | 0.75 | 0.75 | 0.75 |
| Black Pigment | 0.5 | 0.5 | 0.5 |
| Triethanolamine in molecular sieve | 2 | — | — |
| Tetrabromobisphenate A of triethanolamine | — | 1.5 | — |
| Tetrachlorobisphenate A of triethanolamine | — | — | 1.5 |
| Silica Dust | 60 | 60 | 60 |
| Glass Fiber | 5 | 5 | 5 |

The powders are treated as follows: Resins I and II are melted together at a temperature of 110° C. and permitted to cool to 20° C. The solid product which results is then crushed to a fine powder. The other ingredients are added and mixed to form a uniform composition. The mixture is then melted and compacted in a kneader to form a uniform band which, upon cooling is crushed into a powder which can be used for transfer molding. The resulting powders are evaluated by a fluidity test utilizing the spiral flow technique. This test is a standardized test developed by the Epoxy Molding Materials Institute of New York and is referred to as EMMI-1-66 (Method of Test for Spiral Flow). A good epoxy type molding powder has a long spiral flow, with little change in spiral flow during extended periods of storage. Thus variation of the spiral flow with age and the storage temperature is an effective measure of the stability of epoxy molding powder.

The spiral flow test was effected on the powder immediately after fabrication, after storage for one month at 20° C. and after an accelerated aging for 10 hours at 43° C. which corresponds to about 3 months of storage at 20° C. The results were the following:

|  | Spiral flow in cm | | |
|---|---|---|---|
| Time of Evaluation | Powder A | Powder B | Powder C |
| Just after Preparation | 43.18 | 88.90 | 96.52 |
| After 1 month at 20° C. | 30.48 | 86.36 | 91.44 |
| After accelerated aging (10 h. at 43° C.) | 7.62 | 71.12 | 63.50 |

This table clearly shows that even when the powder is freshly prepared, the melting powder prepared from triethanolamine in the molecular sieve is comparatively mediocre and further that it degrades rapidly on storage whereas the powders utilizing the halogenobisphenates of triethanolamine of the invention initially and on storage have high stabilities.

EXAMPLE 9

Four powders are prepared from the same basic resins as in Example 8. Powder D contains the free tertiary amine 2,4,6-tris(dimethylaminomethyl)phenol, adsorbed in a ratio by weight of 1 part to 3 parts of colloidal silica. Powder E contains a prior art tertiary salt, namely the tri-2-ethylhexoate of 2,4,6-tris(dimethylaminomethyl)phenol adsorbed in the same proportion on colloidal silica.

Powder F contains the latent catalyst of the invention tetrabromophenate A of 2,4,6-tris(dimethylaminomethyl)phenol while powder G contains the tetrachlorobisphenate A of 2,4,6-tris(dimethylaminomethyl)phenol.

The complete formulations are shown in the following table:

|  | Powder D | Powder E | Powder F | Powder G |
|---|---|---|---|---|
|  | (Parts by Weight) | | | |
| Epoxy Resin | 21 | 20.2 | 20.2 | 20.2 |
| Phenolic Novolac Resin II | 12 | 11.6 | 11.6 | 11.6 |
| Calcium Stearate | 1 | 1 | 1 | 1 |
| Black Pigment | 0.5 | 0.5 | 0.5 | 0.5 |
| 2,4,6-tris(dimethylaminomethyl)phenol with colloidal silica | 0.65 | — | — | — |
| Tri-2-ethylhexoate of 2,4,6-tris(dimethylaminomethyl) phenol with colloidal silica | — | 1.7 | — | — |
| Tetrabromobisphenate of 2,4,6-tris(dimethylaminomethyl)phenol | — | — | 1.7 | — |
| Tetrachlorobisphenate A of 2,4,6-tris(dimethylaminomethyl)phenol | — | — | — | 1.7 |
| Silica Meal | 60 | 60 | 60 | 60 |
| Glass Fiber | 5 | 5 | 5 | 5 |

The powders are treated and evaluated in the same manner as in Example 8.

This table shows clearly that the molding powder made with the free tertiary amine as well as the molding powder made with the tertiary amine salt of the prior art are mediocre as to stability after one month of storage at 20° C., are even more unstable at higher temperature storage and have low stability in the accelerated aging test. The molding powders utilizing the halogenobisphenates of the same tertiary amine are perfectably stable within the limits of experimental error at 20° C. and have high stability at higher temperatures.

EXAMPLE 10

Two powders are prepared utilizing as the basic resin a solid epoxidized phenolic novolac resin (resin III) having an epoxy equivalent of 185 and a functionality of about 5.5 and a melting point of 74° C. The resin II is identical to that used in Examples 8 and 9. Powder H contains the tetrabromobisphenate A of benzyldimethylamine. Powder I contains the tetrachlorobisphenate A of benzyldimethylamine. The complete formulations are shown in the following table:

|  | Powder H | Powder I |
| --- | --- | --- |
|  | (Parts by Weight) |  |
| Epoxy resin III | 22.8 | 20.2 |
| Phenolic novolac resin II | 11.4 | 11.4 |
| Montanic acid based synthetic wax | 0.6 | 0.6 |
| Black pigment | 0.5 | 0.5 |
| Tetrabromobisphenate A of benzyldimethylamine | 1.5 | — |
| Tetrachlorobisphenate A of benzyldimethylamine | — | 1.5 |
| Silica meal | 63 | 63 |

The powders are treated in the following manner: The resins, lubricating agent, pigment and catalyst are all ground to a fine powder. Then the filler is added and the composition blended until the mixture is perfectly uniform. The mixture is then melted densified (kneaded) and crushed as in Example 8. The samples of the two powders were transfer-molded at 150° C. The gellification time of powder H was about 50 seconds while that of powder I was about 60 seconds. The flowing and hardening characteristics of the powder were found to be unchanged after three months of storage at ambient temperature.

EXAMPLE 11

The following powder formulation is prepared for application by a fluidized bed process:

| Epoxy resin IV | 56 parts by weight |
| --- | --- |
| Cresylic novolac resin V | 28 parts by weight |
| Acrylron MFP powder (flow promoting agent mfg. by PROTEX, France) | 1 part by weight |
| Tetrabromobisphenate A of isopropylimidazole | 1.5 parts by weight |
| Titanium dioxide | 13.5 parts by weight |

The epoxy resin IV is a multifunctional (n=4) resin of the tetraglycidyl-1,1,2,2(para-hydroxyphenyl)ethane type with an epoxy equivalent of 180–200. The cresylic novolac resin V is a solid resin with a melting point of about 100° C. and a viscosity at 150° C. of about 1000 centipoises.

The powdered materials of this form of composition are intimately dry mixed in a kneader and the mixture is then melted, densified and cooled as in Example 8. The resulting composition is then ground to about 250 microns. The fine powder thus obtained is fluidized in a laboratory fluidized bed apparatus and a cylindrical steel cylinder having a diameter of 2.5 cm and a length of 10 cm is preheated to 200° C. over a period of 15 minutes. This heated specimen is then introduced into the fluidized bed for 5 seconds. It is then removed and the gellification time of about 50 seconds is determined. The test cylinder and other steel substrates of various dimensions and shapes are coated in a similar manner with complete hardening of the coating being effected by maintaining the specimen for 10 minutes in an oven at 200° C. The coatings thus obtained are smooth, adherent, esthetic and have excellent physical properties.

EXAMPLE 12

Two molding powders containing a solid epoxidized cresylic novolac resin VI having an epoxy equivalent of 230 and a melting point of about 80° C. and a solid cresylic novolac resin VII with a melting point of about 100° C. and a viscosity at 150° C. of about 1000 centipoises. The powder J utilizes the tetrabromobisphenate A of triethylenediamine while powder K contains the tetrachlorobisphenate A of triethylenediamine. The complete formulations are as follows:

|  | Powder J | Powder K |
| --- | --- | --- |
|  | (Parts by Weight) |  |
| Epoxy resin VI | 23.5 | 23.5 |
| Cresylic novolac resin VII | 11 | 11 |
| Calcium stearate | 0.25 | 0.25 |
| Zinc stearate | 0.75 | 0.75 |
| Tetrabromobisphenate A of triethylenediamine | 1. | — |
| Tetrachlorobisphenate A of triethylenediamine | — | 1 |
| Black pigment | 0.5 | 0.5 |
| Silica meal | 63 | 63 |

The powders are treated and evaluated as in Example 10. The gellification time of powder J is about 40 seconds while that of powder K is about 50 seconds, the hardening times being respectively about 1 minute 30 seconds and 2 minutes. The flow characteristics and the hardening characteristics of the powders change little even after storage for 3 months at ambient temperature.

EXAMPLE 13

The following liquid systems are prepared:

|  | e | f | g | h |
| --- | --- | --- | --- | --- |
| Liquid epoxy resin VIII | 100 | 100 | — | — |
| Liquid epoxy novolac resin IX | — | — | 100 | 100 |
| Phenolic novolac resin X | 60 | 60 | 60 | 60 |
| Tetrabromobisphenate A of isopropylimidazole | — | 0.7 | — | 0.7 |

The tetrabromobisphenate A of isopropylimidazole is dissolved at an elevated temperature (about 60° C.) in the phenolic novolac resin. Then at a temperature of about 60° C., this mixture is combined with the liquid epoxy resin. The mixtures e–h are placed in an oven at 125° C. Mixtures e and g are found to be liquid after 6 hours at 125° C. while the mixture f gellifies to a hard state after 70 minutes while the mixture h dissolves to a hard state at about 90 minutes. The mixtures f and h have a stable viscosity after storage for a week at ambient temperature and the latency of the halogenobisphenates of the invention are thus shown to be present even in liquid systems. The epoxy VIII resin is a bisphenol A epoxy with an epoxy equivalent of 180. The liquid epoxy resin IX is of the epoxidized phenolic novolac resin with an epoxy equivalent of 175 and a functionality of about 2.2. The phenolic novolac resin X is a semi-solid resin having a melting point of about 52° C. and a viscosity of about 600 centipoises at 80° C.

We claim:

1. A latent catalyst or accelerator for an epoxy system which consists of a water insoluble halogenobisphenate of a catalytically active tertiary amine.

2. A catalyst or accelerator as defined in claim 1 which consists of a reaction product of halogenobisphenol selected from the group which consists of chlorinated, brominated, iodinated or fluorinated, bisphenol A, bisphenol B, bisphenol F, 4,4'-dihydroxydiphenyl or 4,4'-dihydroxydiphenylsulfone and a catalytically active tertiary amine.

3. A catalyst or accelerator defined in claim 2 wherein the tertiary amine is selected from the group which consists of benzyldimethylamine, 2-2(dimethylaminemethyl)phenol, 2,4,6-tris(dimethylaminemethyl)phenol, triethanolamine, triethylamine, triethylenediamine, imidazole, isopropylimidazole and 2-ethyl-4-methylimidazole.

4. The catalyst or accelerator defined in claim 3 which is the tetrabromobisphenate A of one of said tertiary amines.

5. The catalyst or accelerator defined in claim 3 which is the tetrachlorobisphenate A of one of said tertiary amines.

6. The catalyst or accelerator defined in claim 3 wherein the halogenobisphenate of the tertiary amine has a molecular ratio of phenol equivalent to tertiary amine equivalent between substantially 1 and 4.

7. The catalyst or accelerator defined in claim 6 wherein said ratio is between substantially 1.25 and 3.

8. A method of making a catalyst or accelerator for an epoxy system as defined in claim 3 which consists essentially of adding to an aqueous dispersion of one of said halogenobisphenols, one of said tertiary amines and heating the reaction mixture to a temperature between 50° C. and 100° C. over a period of 3 to 6 hours, cooling the resulting reaction mixture, filtering the cooled reaction mixture to obtain a solid product, washing the solid product and drying the same at a temperature of 70° to 80° C. and thereby obtaining a whitish freely flowable solid powder substantially free from odor.

9. An epoxy resin composition comprising a reactive epoxy component and a quantity of a catalyst as defined in claim 3 corresponding to substantially 0.2 to 20% by weight of said component.

10. The epoxy resin system defined in claim 9 wherein said reactive component comprises at least one epoxy resin selected from the group which consists of bisphenol A epoxy resins, epoxidized phenol novolac resins and epoxidized cresylic novolac resins together with a phenolic novolac or cresylic novolac resin hardener which can be halogenated.

11. The epoxy resin system defined in claim 10 in the form of a solid powder stable at ambient temperature and hardening rapidly to a continuous solid at a temperature upwards of about 150° C.

12. The epoxy resin system defined in claim 10 in the form of a liquid which is stable at ambient temperature and rapidly hardens to a solid material at temperatures above about 120° C.

* * * * *